UNITED STATES PATENT OFFICE.

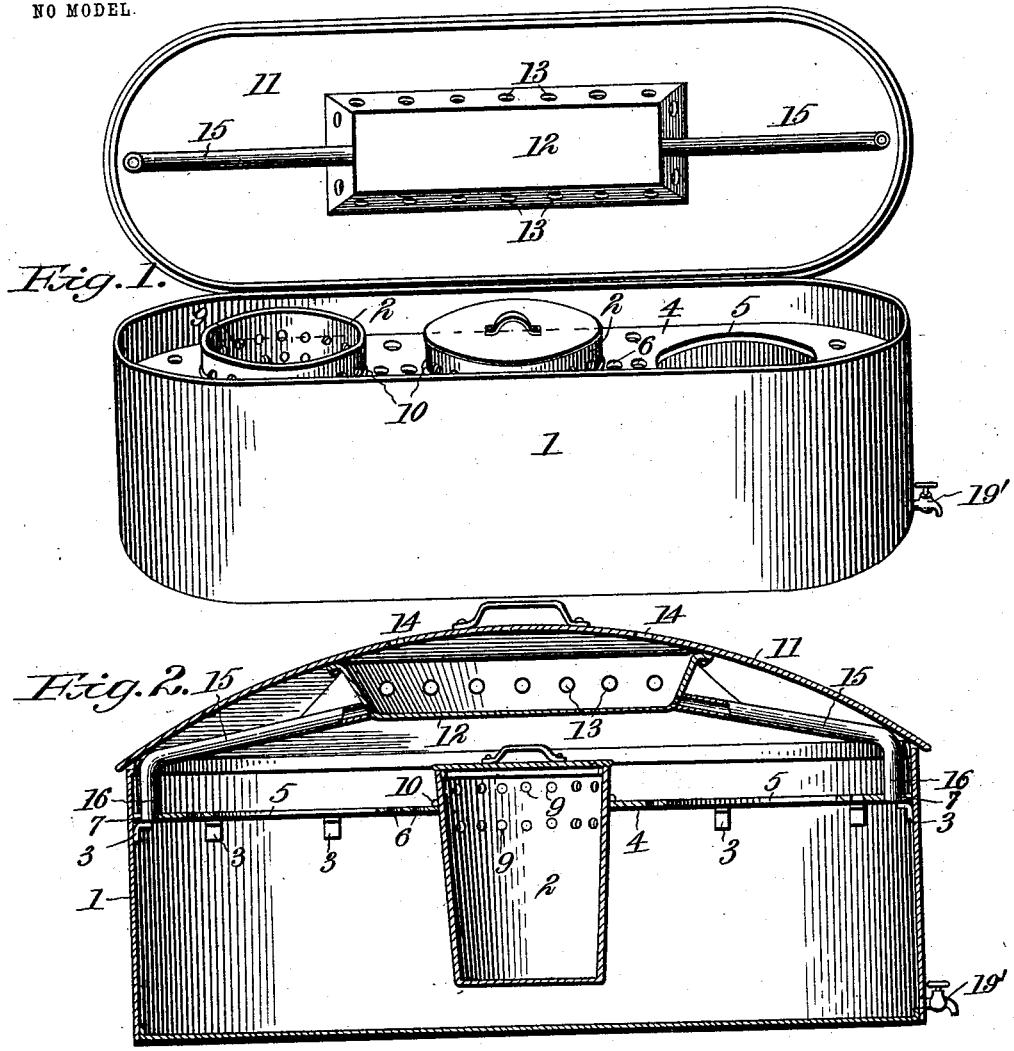

WILLIAM R. FLACK, OF TOLEDO, OHIO.

STEAM-COOKER.

SPECIFICATION forming part of Letters Patent No. 722,964, dated March 17, 1903.

Application filed November 14, 1902. Serial No. 131,370. (No model.)

*To all whom it may concern:*

Be it known that I, WILLIAM R. FLACK, a citizen of the United States, residing at Toledo, in the county of Lucas and State of Ohio, have invented certain new and useful Improvements in Steam-Cookers; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to an improvement in steam-cookers.

The object is to provide an inexpensive cooker adapted to contain a plurality of removable cooking vessels, so that different articles of food may be cooked at the same time, and a further object is to provide a chamber in which the steam is condensed and the water of condensation returned to the water-reservoir.

With these objects in view the invention consists in the novel construction, combination, and arrangement of parts, all as will be more fully described hereinafter, illustrated in the accompanying drawings, and finally pointed out in the appended claims.

Referring to the drawings, Figure 1 is a perspective view of the cooker with the hinged lid open, showing the crown-plate, the top of the pots, and the condenser on the cover. Fig. 2 is a longitudinal vertical section of the cooker with the lid thereon.

In carrying out the invention the steam-cooker comprises an outer vessel 1, which may be of any shape, but preferably long and narrow, as shown, to be adapted to contain a plurality of cooking vessels or pots 2, arranged in longitudinal alinement in the same horizontal plane, so that the different articles of food contained in the different pots will be acted upon uniformly by the even diffusion of heat throughout the vessel 1. Secured to the sides and at each end on the interior of the vessel 1 are lugs or brackets 3, adapted to support a crown-plate 4, having a plurality of large apertures 5, in which the pots are fitted, and a plurality of perforations 6 for the escape of the steam to the top or cover of the vessel. In each end of the crown-plate is a hole 7, the purpose of which will be explained hereinafter.

The sides of the pots 8 are provided with two rows of apertures 9, and between the rows is an annular flange 10, which engages the edges of the apertures 5 of the crown-plate to hold the pots suspended in the vessel 1 in such a manner that the lower row of apertures will be below the crown-plate and the upper row above the crown-plate, so that the steam generated from the water in the bottom of the vessel will pass into the pots through the lower row of apertures and escape through the upper row. It will be understood that the annular flange 10 on the pots may be dispensed with and the tapering sides of the pots be of sufficient diameter to wedge in the apertures in the crown-plate.

As shown in the drawings, the cover 11 may be hinged to the vessel 1, and upon the inside thereof is a condenser 12, which consists of a chamber the walls of which depend from the top of the cover and converge toward the bottom, and in the tapering sides are formed apertures 13, through which the steam enters. In the top of the cover 11 are apertures 14, which permit cold air to enter the condensing-chamber to facilitate the condensation of the steam.

15 designates the conduit-tubes, one at each end of the condensing-chamber, for conducting the water of condensation back to the vessel 1. These tubes project a short distance below the bottom of the cover, as at 16, so that when the cover is closed the ends of the tubes will engage the holes 7 in the crown-plate and permit the water to be returned to the vessel 1.

A suitable spigot 19' is provided for drawing off the water which is first poured in the vessel 1. The steam will enter the pots through the lower row of perforations and escape through the upper row, it being premised that the pots are covered by the usual lids. Owing to the approximate conical shape of the cover 11 the rising steam will be deflected to the condenser located in the top thereof. The steam will contact with the cool top of the cover and condense, such action being greatly facilitated by the cold air entering the chamber through the apertures 14, and the water of condensation is then returned to the vessel 1 by means of the conduits 15.

It will be understood that my improved cooker can be used for boiling as well as steaming.

Having thus described my invention, what I claim, and desire to secure by Letters Patent, is—

1. In a steam-cooker, the combination with a vessel having a plurality of pots arranged therein in a horizontal plane, of a cover having a condenser therein, means for admitting air to the condenser, and means for returning the water of condensation to the vessel.

2. A steam-cooker comprising a vessel having a crown-plate detachably posited therein, pots supported by the crown-plate, a cover having a condenser therein, means for admitting air to the condenser, and conduits extending through the crown-plate to return the water of condensation to the vessel.

3. In a steam-cooker, the combination with a vessel adapted to contain water, of a cover for the vessel having a condenser therein, apertures in the walls of the condenser for admission of steam, apertures in the cover to admit air to the condenser, and tubes leading from the condenser and projecting below the cover at the ends thereof to conduct the water of condensation to the vessel.

4. In a steam-cooker, the combination with a vessel, of a crown-plate detachably posited therein and provided with apertures at the ends thereof, pots detachably supported by the crown-plate and having rows of apertures in the wall thereof arranged to admit the steam to the pots from beneath the crown-plate and exhaust therefrom above the crown-plate, a cover provided with a condenser, and tubes leading from the condenser and extending into the apertures at the ends of the crown-plate to return the water of condensation to the vessel.

5. In a steam-cooker, the combination of a vessel having a crown-plate detachably posited therein and provided with apertures at the ends thereof and a plurality of holes adapted to receive pots, the pots each having two rows of apertures in their walls so arranged that the lower row will be below the crown-plate to admit steam to the pot and the upper row above the crown-plate for the exit of the steam, a cover having a condenser in the top thereof, perforations in the walls of the condenser for admission of the steam, tubes leading from each end of the condenser and extending into the apertures at the ends of the crown-plate, and means to admit air to the condenser.

In testimony whereof I affix my signature in presence of two witnesses.

WILLIAM R. FLACK.

Witnesses:
J. W. ARMSTEAD,
D. SLEAUTEAU.